United States Patent [19]
Sugita

[11] Patent Number: 5,440,552
[45] Date of Patent: Aug. 8, 1995

[54] ATM CELL ASSEMBLING/DISASSEMBLING SYSTEM

[75] Inventor: Masahiro Sugita, Tokyo, Japan
[73] Assignee: NEC Corporation, Tokyo, Japan
[21] Appl. No.: 182,987
[22] Filed: Jan. 19, 1994
[30] Foreign Application Priority Data
   Jan. 21, 1993 [JP] Japan .................. 5-027297
[51] Int. Cl.⁶ ............... H04L 12/56; H04L 12/66
[52] U.S. Cl. ........................... 370/60; 370/79
[58] Field of Search ............. 370/94.1, 94.2, 110.1, 370/15, 16, 60, 100.1, 79, 85.1, 85.13, 92, 93

[56] References Cited

U.S. PATENT DOCUMENTS

| 5,237,569 | 8/1993 | Sekihata et al. | 370/94.1 |
| 5,315,588 | 5/1994 | Kajiwara et al. | 370/60.1 |

FOREIGN PATENT DOCUMENTS

| 404078A2 | 6/1990 | European Pat. Off. |
| 406759A2 | 7/1990 | European Pat. Off. |
| 482550A1 | 10/1991 | European Pat. Off. |
| 530680A2 | 8/1992 | European Pat. Off. |
| 63-52540 | 8/1986 | Japan |
| 63-52541 | 8/1986 | Japan |
| 63-52542 | 8/1986 | Japan |

OTHER PUBLICATIONS
European Search Report, dtd Oct. 31, 1994.

Primary Examiner—Douglas W. Olms
Assistant Examiner—Ricky Q. Ngo
Attorney, Agent, or Firm—Whitham, Curtis, Whitham & McGinn

[57] ABSTRACT

Successive received asynchronous transfer mode (ATM) data cells are stored in a cell reception buffer. All address information included in the received ATM cells in an address table are registered, and the same address information in the address table are updated when there is idle time for a process of assembling packet data from the ATM cells or when there is no empty area in the address table. In a packet reception buffer successive received packet data are stored. The packet data stored in the packet reception buffer are disassembled into ATM data on the basis of address information retrieved from the address table.

5 Claims, 3 Drawing Sheets

FIG.3

| DA Field | VPI Field | VCI Field | |
|---|---|---|---|
| | | | |
| | | | |
| | | | | ns transfer mode) cell assembling/disassembling system and, more particularly, to a system for managing and controlling an address table used to determine transmission address information when assembling and disassembling ATM cells.

ATM CELL ASSEMBLING/DISASSEMBLING SYSTEM

BACKGROUND OF THE INVENTION

The present invention relates to an ATM (asynchronous transfer mode) cell assembling/disassembling system and, more particularly, to a system for managing and controlling an address table used to determine transmission address information when assembling and disassembling ATM cells.

In a CLAD (cell assembling/disassembling) unit for disassembling and reassembling VBR (variable bit rate) system data, for instance packets, received from a LAN (local area network) such as ETHERNET, into and from ATM cells, an address table for registering address information is provided. The address information included in the received ATM cells such as a transmission source address SA indicative of the transmission source, VPI (virtual path identifier) for identifying different virtual path links that are multiplexed in the same physical layer connection on an ATM layer and VCI (virtual channel identifier) for identifying different virtual channel links in the virtual path connection are registered.

When disassembling the received packet data from the LAN to generate an ATM cell, the address table is retrieved by using a destination address DA of the received packet data as a retrieval key, and the ATM cell is generated on the basis of the retrieved VPI and VCI.

In this prior art address table management and control system, when registering the transmission source address SA, VPI and VCI included in the received ATM cell message in the address table, the address table is retrieved. If these data have not yet been registered, they are additionally registered in the address table. If they have been registered, the registered contents are updated.

In such prior art address table management and control system for determining addresses, the address table is retrieved for each received message by using ATM cells, increasing the retrieval time and adding considerable overhead to the process of address determination.

SUMMARY OF THE INVENTION

It is therefore an object of the present invention to provide an ATM cell assembling/deassembling system, which permits fast and efficient address determination with low overhead.

According to one aspect of the present invention, there is provided an ATM cell assembling/disassembling system comprising a cell reception buffer for storing successive received ATM (asynchronous transfer mode) data, packet generation means for assembling packet data from the ATM cells stored in the cell reception buffer, an address table for registering address information included in the received ATM cells, a packet reception buffer for storing successive received packet data, and cell generation means for disassembling the packet data stored in the packet reception buffer into ATM data on the basis of address information retrieved from the address table, the control means being operative to register all address information of the received ATM cells in the address table at the time of the registration and update the same address information in the address table when there is idle time for a process of assembling packet data from the ATM cells or when there is no empty area in the address table.

According to another aspect of the present invention, there is provided an ATM cell assembling/disassembling method comprising steps of storing successive received asynchronous transfer mode (ATM) data cells in a cell reception buffer, assembling packet data from the ATM cells stored in the cell reception buffer, registering all address information included in the received ATM cells in an address table, and updating the same address information in the address table when there is idle time for a process of assembling packet data from the ATM cells or when there is no empty area in the address table, storing in a packet reception buffer successive received packet data, and disassembling the packet data stored in the packet reception buffer into ATM data on the basis of address information retrieved from the address table.

In the above system, the control means updates the same address information in the address table by sorting the address information and deleting a plurality of entries having the same address value except one when there is idle time for a process of assembling packet data from the ATM cells or when there is no empty area in the address table. The address information includes a transmission source address SA indicative of a transmission source, VPI (virtual path identifier) for identifying different virtual path links that are multiplexed in the same physical layer connection on the ATM layer and VCI (virtual channel identifier) for identifying different virtual channel links in the virtual path connection included in the received ATM cells.

Other objects and features will be clarified from the following description with reference to attached drawings.

BRIEF DESCRIPTION OF THE DRAWINGS

FIG. 3 shows an example of data registered in the address table 2 in FIG. 1.

DETAILED DESCRIPTION OF THE PREFERRED EMBODIMENTS

Figure 1:
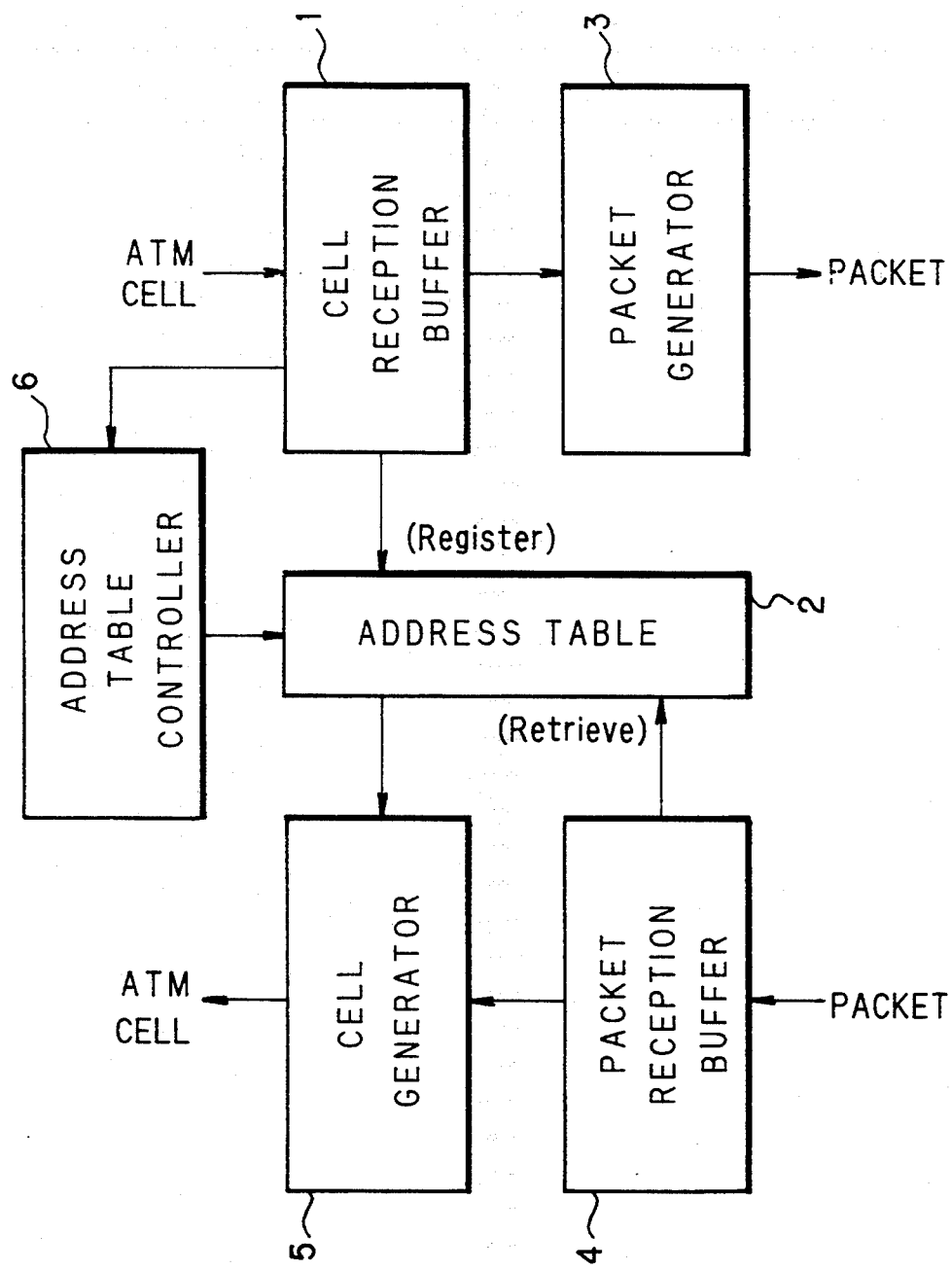
FIG. 1 shows a block diagram showing an embodiment of the present invention.

FIG. 1 is a block diagram showing an embodiment of the present invention. Referring to the FIG. 1, a cell reception buffer 1 stores successive received ATM cells. Of these cells, address information such as VPI, VCI and the transmission source address SA, included in a BOM (beginning of message) cell, a leading cell in each message, are registered in an address table 2.

A packet generator 3 assembles the stored cells in the cell reception buffer 1 into packet data and transmits the data in the form of packets to the LAN.

A packet reception buffer 4 stores successive packet data from the LAN and retrieves the VPI and VCI corresponding to the destination address DA of each packet from the address table 2. A cell generator 5 generates ATM cells using the packets read out from the packet reception buffer 4 and the VPI and VCI retrieved from the address table 2 and transmits the generated ATM cells to a bus in the system.

Figure 3:
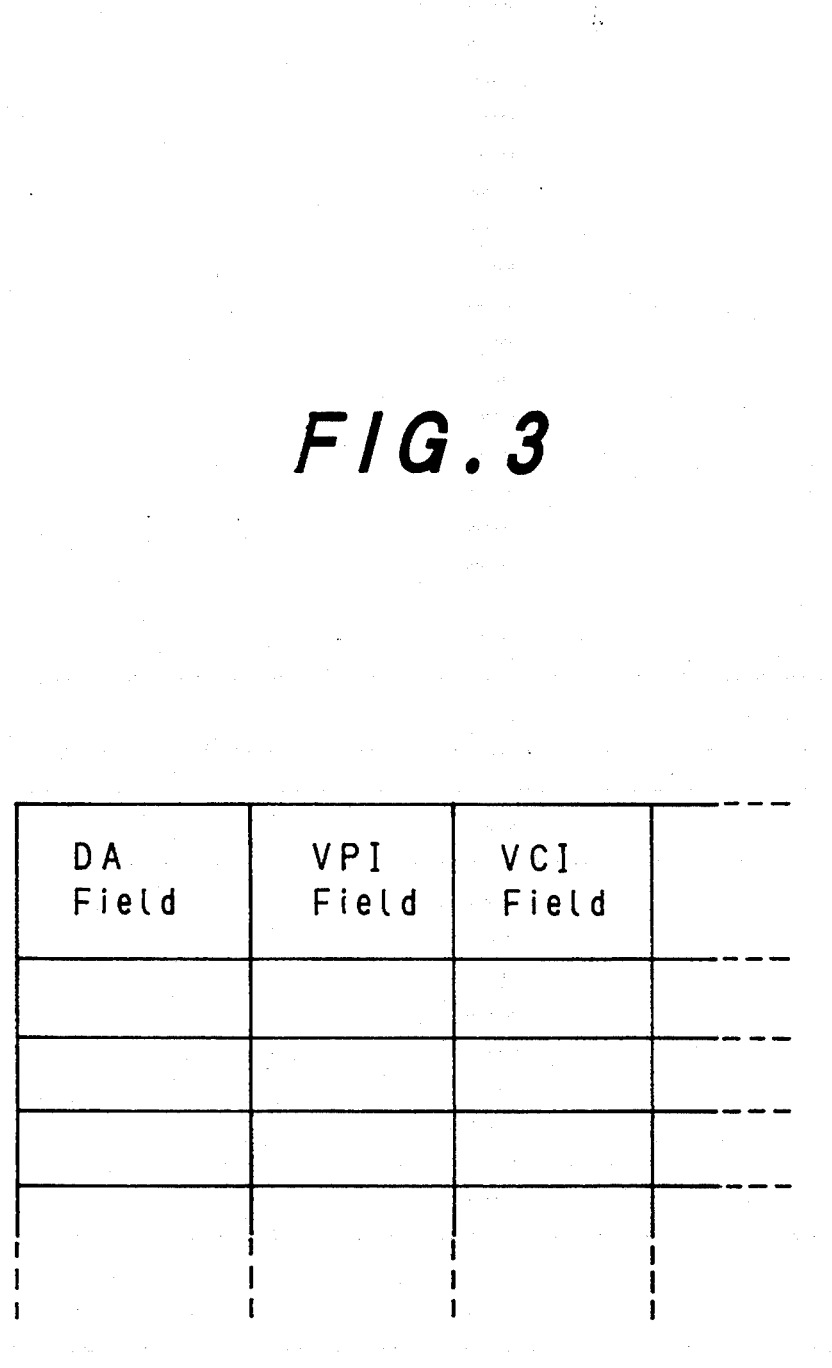

FIG. 3 shows an example of data registered in the address table 2. A destination address DA field, VPI field and VCI field are registered as respective corresponding entries. In this registration, the transmission source address SA of the BOM cell in the ATM cell received in the cell reception buffer 1 is registered in the destination address DA in the address table 2. This is done because the disassembling of the received packet data to the ATM cells in the cell generator 5 requires the VPI and VCI corresponding to the destination address DA of the received packet data, and the destination address DA is the transmission source address SA at the time of the registration.

An address table controller 6 controls the registration, the retrieval and a sort operation of the address table 2. In the registration operation, all address information in the received ATM cell is registered in the address table 2. When there is no empty area in the address table 2, or when there is idle time for a process of assembling the received ATM cells to the packet data, a process of simplifying or making the same address information into single information is executed through sorting of the table.

Figure 2:
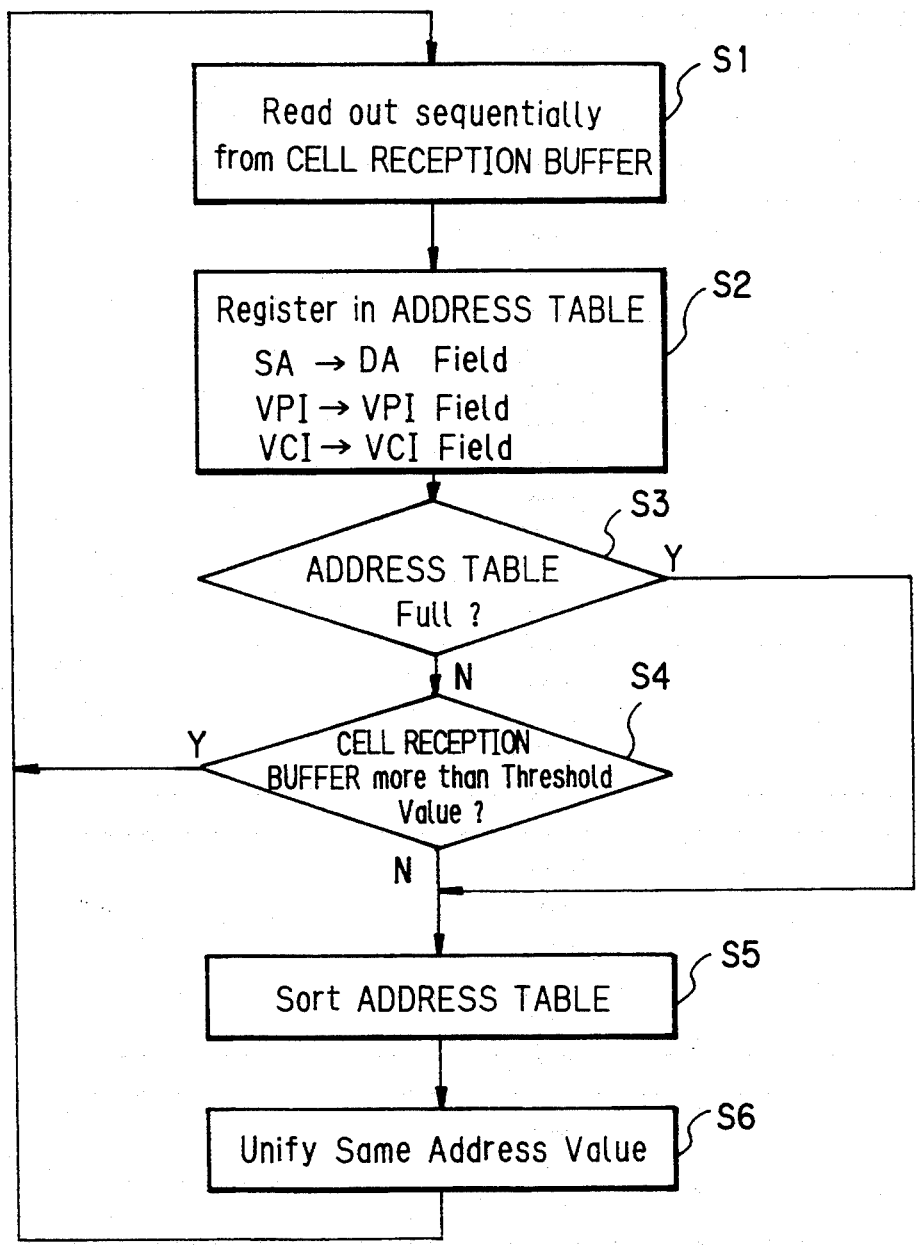
FIG. 2 shows a flowchart for explaining the operation of the embodiment.

FIG. 2 is a flow chart showing the operation of the embodiment according to the present invention shown in FIG. 1. The received ATM cells are read out sequentially from the cell reception buffer 1 (step S1). Of these read-out cells, VPI, VCI and the transmission source address SA as address information provided in the BOM, are registered in the address table 2 (step S2).

In the registration operation in the address table 2, all address information of the BOM cell is registered irrespective of whether there is any previous registration. This means that, unlike the prior art, no check is made as to whether there is any registration, remarkably reducing the registration time.

As shown in the step S2, the transmission source address SA of the cell is registered in the DA field of the address table 2, VPI, in the VPI field, and VCI, in the VCI field. The information thus is registered progressively and additionally in the empty areas.

The packet generator 3 assembles the received ATM cells into the packet data and transmits the packet data in the form of packets to the LAN.

The received packets from the LAN are successively stored in the packet reception buffer 4. The packet data is successively read out from the packet reception buffer 4 and the retrieval of the address table 2 is executed with the destination address DA of each packet as a retrieval key to read out VPI and VCI corresponding to the destination address DA from the table 2.

The cell generator 5 generates ATM cells on the basis of the packets read out from the buffer 4 and VPI and VCI read out with retrieval from the address table 2. While the address information is successively stored in the address table 2 in the step S2, when the transmission source receives a plurality of the same cells, a plurality of the same address information pieces are registered in the address table 2 at this time since no check as to whether there is any registration.

If there still is an empty area in the address table 2 (step S3) and also if the number of cells stored in the cell reception buffer 1 is more than a predetermined threshold value (step S4), the processes of the reading out from the cell reception buffer 1 (step S1) and the registration of address information in the address table 2 are continued.

If the number of cells stored in the cell reception buffer 1 is less than the threshold value (step S4), there is an idle time for the packet data generation process. This idle time is utilized to effect rearrangement (or sorting) of data in the address table 2 with the DA field (step S5). As a result, there are a plurality of entries having the same address value, they are all deleted except one (step S6).

If data has been written in all the areas of the address table 2 so that no more data can not be written (step S3), the registered data are made to be single data through the same process as the steps S3 through S6. The above process of the steps S3 through S6 is executed in the address table controller 6.

In the above way, the address information is all registered in the address table without making any check as to whether there is any registration. Further, when there is no empty area in the address table or when there is idle time for the cell processing, the same address information is made to be single data through sorting of the table with the DA field. In this way, the above effects are obtainable.

As described before, in the conventional system, a check is made as to whether the address information is registered after the retrieval of the address table for each reception of the ATM cell message.

In contrast, in the operation of the above embodiment, all address information is registered and the sorting of the table and making data to single data is executed at a certain timing, reducing the overhead on the process of address determination and permitting more efficient and faster address determination.

What is claimed:

1. An asynchronous transfer mode (ATM) cell assembling/disassembling system comprising:
   a cell reception buffer connected to a system bus for storing successive received ATM data cells,
   packet generation means connected to a local area network (LAN) for assembling packet data from the ATM data cells stored in said cell reception buffer,
   an address table for registering address information included in said received ATM dam cells,
   a packet reception buffer for storing successive received packet data from the LAN,
   cell generation means connected to the system bus for disassembling the packet data stored in said packet reception buffer into ATM cell data on the basis of address information retrieved from said address table, and
   control means for controlling registration and retrieval of address information in said address table, said control means being operative to register all address information of said received ATM data cells in said address table at the time of receiving the ATM data cells and update address information which is the same in said address table only when there is idle time for a process of assembling packet data from said ATM data cells by said packet generation means or when there is no empty area in said address table.

2. An ATM cell assembling/disassembling system as set forth in claim 1, wherein said control means updates address information the same in said address table by sorting the address information and deleting a plurality of entries having the same address value except one when there is idle time for the process of assembling packet data from said ATM data cells by said packet generation means or when there is no empty area in said address table.

3. An ATM cell assembling/disassembling system as set forth in claim 1, wherein said address information are a transmission source address (SA) indicative of a transmission source, a virtual path identifier (VPI) for identifying different virtual path links that are multiplexed in a same physical layer connection on an ATM layer and a virtual channel identifier (VCI) for identifying different virtual channel links in a virtual path connection included in the received ATM data cells.

4. A method for asynchronous transfer mode (ATM) data cell assembling/disassembling comprising the steps of:

storing successive received asynchronous transfer mode (ATM) data cells from a system bus in a cell reception buffer, assembling packet data for a local area network (LAN) from the ATM data cells stored in said cell reception buffer, registering all address information included in said received ATM data cells in an address table, and updating address information which is the same in said address table when there is idle time for a process of assembling packet data from said ATM data cells or when there is no empty area in said address table, storing in a packet reception buffer successive received packet data from the LAN, and disassembling the packet data stored in said packet reception buffer into ATM data cells on the basis of address information retrieved from said address table.

5. The as set forth in claim 4, wherein the step of updating address information which is the same in said address table comprises the steps of:

sorting the address information, and deleting a plurality of entries having the same address value except one when there is idle time for the process of assembling packet data from said ATM data cells or when there is no empty area in said address table.

* * * * *